United States Patent [19]

Sausner et al.

[11] Patent Number: 4,675,589

[45] Date of Patent: Jun. 23, 1987

[54] METHOD AND DEVICE FOR PRODUCING A PULSED SETTING VOLTAGE

[75] Inventors: Andreas Sausner, Frankfurt am Main; Gerhard Ruschek, Hattersheim, both of Fed. Rep. of Germany

[73] Assignee: VDO Adolf Schindling AG, Frankfurt am Main, Fed. Rep. of Germany

[21] Appl. No.: 776,945

[22] Filed: Sep. 17, 1985

[30] Foreign Application Priority Data

Sep. 21, 1984 [DE] Fed. Rep. of Germany ....... 3434644

[51] Int. Cl.[4] ........................................ G05B 11/28

[52] U.S. Cl. ................................ 318/599; 318/606; 332/10; 123/361

[58] Field of Search ...................... 318/599, 341, 606; 332/10, 22; 123/361

[56] References Cited

U.S. PATENT DOCUMENTS

| | | | |
|---|---|---|---|
| 3,486,090 | 12/1969 | Auvil | 318/606 |
| 3,548,865 | 12/1970 | Pouinger | 318/663 X |
| 4,482,850 | 11/1984 | Sonada et al. | 318/606 |

*Primary Examiner*—Benjamin Dobeck

*Attorney, Agent, or Firm*—Martin A. Farber

[57] ABSTRACT

In a method for producing a pulsed setting voltage (v), said voltage is pulse-duration modulated with an electric control variable. The setting voltage serves to act on a setting drive having an inductance, particularly an electric motor setting drive (9) of a throttle valve (11) of an internal combustion engine. In order to obtain at the same time good periodic excitation of the setting drive as well as a low electric loss power in the setting drive, the setting voltage which is pulsed with a high clock frequency ($f_0$) is pulse-duration modulated with a low fundamental-modulation frequency ($f_m$) as well as a control variable.

9 Claims, 3 Drawing Figures

METHOD AND DEVICE FOR PRODUCING A PULSED SETTING VOLTAGE

BACKGROUND AND FIELD OF THE INVENTION

The present invention relates, in general, to a method and device for producing a pulsed voltage which is pulse-duration modulated in a control system for setting the position of a mechanical element. In particular the invention relates to a method of producing a pulsed setting voltage, which is pulse-duration modulated with an electric control value, for application of a setting drive having an inductance, particularly an electric motor setting drive of a throttle valve of an internal combustion engine. Also in particular the invention relates to a device for producing a pulsed pulse-duration modulated setting voltage for the operation of a setting drive which has an inductance, particularly an electric motor setting drive of a throttle valve of an internal combustion engine.

Electrically activated setting drives for regulating and control systems are frequently acted on by a pulsed setting voltage which is pulse-duration modulated in accordance with the setting output. The use of the pulse-duration-modulated setting voltage has an advantage, for instance, over the use of a continuous constant voltage of adjustable value in that the system cost is low, and also in that power loss in a pulse generator of the system can be kept relatively low. In the use semiconductor elements which in a power stage of a generator of a pulsed setting voltage, for all practical purposes, short-duration power losses occur only during leading and trailing edges of a pulse. Furthermore, in accordance with the prior art, the pulsing of the setting voltage is advantageously used in order periodically to mechanically excite the setting device so as to reduce or eliminate the influences of mechanical hysteresis which impairs precision.

For the last-mentioned purpose, particularly when using an electric motor setting drive for the actuating of a throttle valve of an internal combustion engine, a pulse frequency of 130 to 160 Hz is customary. The clock frequency should not be too high since, in such case, it may no longer exert a sufficient exciting action due to the mechanical damping of a setting element.

On the other hand, the electric power loss in a setting drive whose equivalent circuit can be regarded as an inductance and a resistance is greater with lower clock frequencies of the pulsed setting voltage. This is due to the fact that the power loss increases with the square of the setting current, and that the variations or ripple of the setting current, which is smoothed by the inductance of the setting drive, is greater with lower clock frequencies of the setting voltage. In other words, if one wants to obtain the highest possible useful output power with a setting drive of a given type and size, a high clock frequency is advisable in order not to exceed a limit value for the power loss.

For the reasons described above, the clock frequency with which a pulsed setting voltage is produced is based on a compromise between conflicting requirements.

In order that a setting drive can fulfill its function, in a regulated or controlled system, of following a control or regulating variable, the setting voltage is pulse-duration modulated by an electric control variable.

In pulse-duration modulation of a setting voltage, the pulse duty factor is influenced to obtain a larger or smaller arithmetic mean value of the setting voltage for control of torque produced by the setting drive.

SUMMARY OF THE INVENTION

Therefore, the object of the present invention is to develop the method of producing a pulsed setting voltage of the aforementioned type to improve precision of positioning, and to reduce power loss upon operation of the setting drive with this setting voltage. Thus with a setting drive of given parameters a higher setting power is to be made possible.

According to the invention the setting voltage which is pulsed with a high clock frequency ($f_o$), is pulse-duration modulated with a low fundamental-modulation frequency ($f_m$) as well as with the control signal.

The invention is based on the principle that the setting voltage is no longer modulated by a single frequency (if the pulsing of the setting voltage is considered modulation) but by two different frequencies which are far apart from each other. There is selected a relatively high clock frequency with which the setting voltage is pulsed but on which, however, a low fundamental-modulation frequency is superimposed. The pulse-duration modulation resulting herefrom can therefore be considered a beating or superimposing of a low fundamental-modulation frequency on a relatively high clock frequency. The foregoing expression "fundamental-modulation frequency" has been selected since this frequency influences the pulse-duration modulation and the pulse duty factor of the pulse-duration-modulated setting voltage, in addition to the normal pulse-duration modulation of the setting voltage by the electric control variable.

The setting voltage produced by the method of the invention has the important advantages that, due to the high clock frequency, it causes only a relatively slight power loss in the setting device since a setting current is smoothed well by inductance of the setting drive as a result of the high frequency. The maximum values of the instantaneous setting current are therefore not substantially higher than the mean value of the setting current, resulting in the low loss power. On the other hand, due to the low-frequency fundamental-modulation frequency with which the setting voltage is pulse-duration modulated, particularly good mechanical excitation of the setting drive is obtained, since the frequency of this fundamental modulation can be made lower than the clock frequency which is otherwise provided for this. The fundamental-modulation frequency is therefore closer to the so-called cutoff frequency of the mechanical system of the setting element, above which a damping of the mechanical transmission behavior takes place. Since the periodic excitation of the mechanical system by the low-frequency fundamental-modulation frequency is particularly effective, the degree of modulation can be kept low. This means that the low-frequency part of the setting voltage, and thus of the setting current, can be set relatively small for a given mechanical excitation. Accordingly, the power loss which is due to this low frequency part of the setting voltage also remains small.

In the setting voltage produced in accordance with the invention, therefore, two frequencies—aside from the electrical control variable—are so combined with each other that the conflicting requirements of good mechanical excitation and low electric power loss in the setting drive are satisfied.

The high clock frequency is preferably set at 10° to 20 kHz while the low fundamental-modulation frequency is 10 to 100 Hz. This frequency range has been found advantageous particularly for typical setting drives for the displacement of throttle valves of internal combustion engines. In this connection it is assumed that the mechanical cutoff frequency of the setting drive above which damping of the transmission behavior occurs lies at about 1 to 10 Hz.

Dimensioning of the clock frequency and of the fundamental-modulation frequency wherein the high clock frequency is set at a value of more than 16 kHz and that the low fundamental-modulation frequency is 40–50 Hz is particularly favorable. Due to the high clock frequency, there is no disagreeable effect on people within the range of human hearing. On the other hand, the fundamental modulation frequency is so low that it lies close to the cutoff frequency, is only slightly damped, and can furthermore be produced at little expense.

Suitable device for the carrying out of the method of the invention comprises a pulse-duration modulator (1) which is fed, for the production of the pulsed setting voltage, by a clock of high clock frequency ($f_o$), said modulator having at least one modulation input (3) which is fed with a low fundamental-modulation frequency ($f_m$) superimposed on the pulse-duration modulation and which is acted on by an electric signal (imput 3*a*) and a dimensioning of the high clock frequency ($f_o$) and of the low fundamental-modulation frequency ($f_m$). These devices serve to produce the setting voltage by the methods described above and make possible the above-indicated advantageous effects of the setting current which is fed into the setting drive with an inductance.

BRIEF DESCRIPTION OF THE DRAWINGS

The invention will be explained in further detail below with reference to the three figures of the drawing, in which.

DETAILED DESCRIPTION OF THE PREFERRED EMBODIMENT

Figure 1:
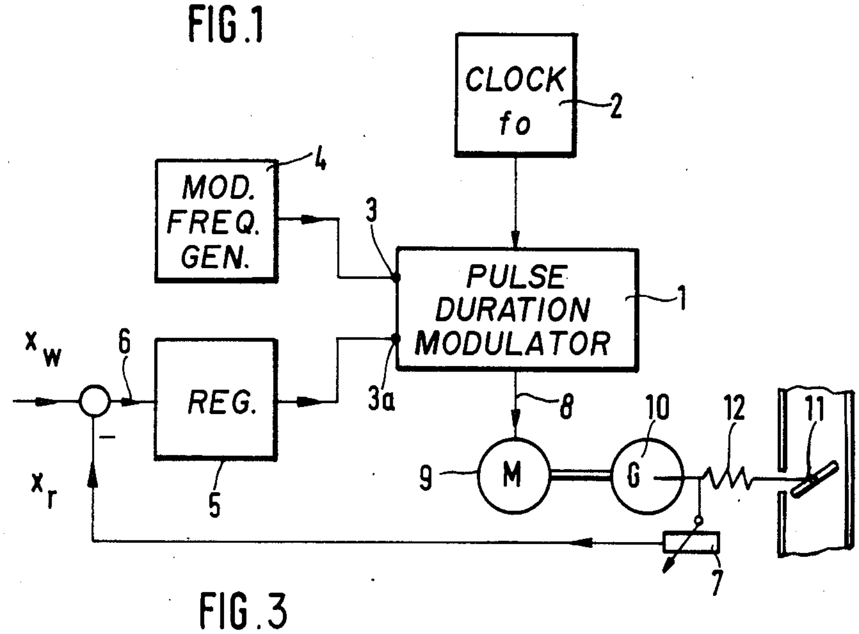
FIG. 1 is a block diagram of a device for producing the setting voltage, in combination with a regulator for displacing a throttle valve of an internal combustion engine.

In FIG. 1, a pulse-duration modulator 1 is fed with a relatively low-frequency clock frequency $f_o$ by a clock 2. The pulse-duration modulator produces a voltage u which is pulsed with the clock frequency $f_o$; in which the corresponding period (FIG. 2) is marked $T_o$.

Figure 2:
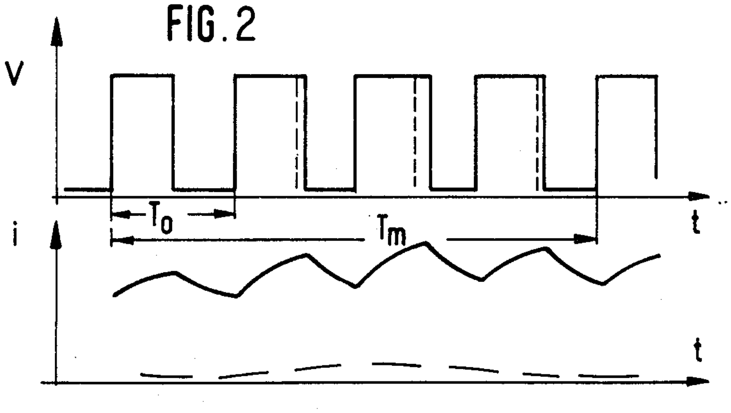
FIG. 2 shows typical time curves for the setting voltage as well as the setting current.

The pulse-duration modulator 1 is connected at its modulation input 3 to a fundamental-modulation frequency generator 4 which feeds a substantially sinusoidal wave signal at a fundamental-modulation frequency $f_m$ corresponding to the period $T_m$ into the pulse modulator. The setting voltage v is therefore pulse-duration modulated with the frequency $f_m$. This is also shown in the curve of FIG. 2 in which the rear pulse edge of the pulse-duration-modulated setting voltage is shown by a solid line. The rear edge shown in dashed line indicates what the course thereof would be if the fundamental-modulation frequency were not present.

Furthermore, the pulse-duration modulator 1 is modulated in customary manner at the modulation input **3*a* by an electric control variable, typically be a control voltage. The control voltage is produced in the present case by a regulator 5 a control deviation $x_w$ and a feedback variable $x_r$ of a setting potentiometer 7** are fed.

The setting voltage produced in the indicated manner by the pulse modulator 1 is fed, via a line 8, into an electric motor setting drive 9.

In the present case the electric motor setting drive actuates a throttle valve 11 via a transmission 10, the position of the transmission being fed back by the setting potentiometer 7.

The course of the setting current can be noted from the curve i in FIG. 2: It can be seen that the setting current exhibits only a slight ripple as a result of the smoothing by an inductance of the electric motor setting drive. This means low thermal power loss in the electric motor setting drive 9, and enables the setting drive, for a given construction, to be fed with a relatively high voltage v to give off a correspondingly large torque.

The current curve which is shown in dashed line (FIG. 2) represents the relatively low-frequency part of the current which is due to the fundamental-modulation frequency and shifts the peak values in the manner indicated. By virtue of the low-frequency part of the current, mechanical excitation is transmitted, via the frame/spring system having the transmission 10 and a spring 12, to transmission elements to the throttle valve 11, which can thus be accurately positioned.

Figure 3:
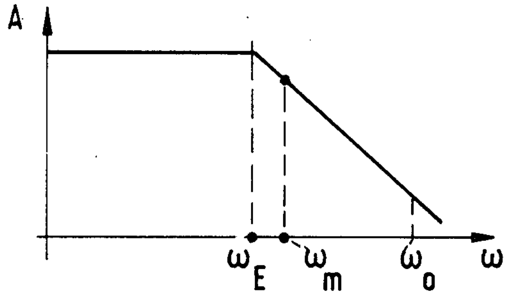
FIG. 3 shows the frequencies provided for the formation of the setting voltage, referred to a cutoff frequency of the setting member, in the form of a Bode diagram.

FIG. 3 shows the so-called cutoff frequency $W_E$ of the frame/spring system in the form of a Bode diagram. The frame/spring system represents a delay of the first order, which means that above the cuttoff frequency, the transmission factor A drops with an increase in the excitation frequency. It can be noted from the Bode diagram that with the fundamental-modulation frequency $f_m$ selected, the transmission factor drops only slightly so that a relatively slight mechanical excitation is sufficient, which is transmitted to the throttle valve. For this reason, the low-frequency part of the setting voltage v and thus of the setting current i is relatively low. The clock frequency $f_o$, which has been selected high with a value of 20 kHz, is, on the other hand, strongly damped, but the high value of $f_o$ is not required in accordance with the invention for the mechanical excitation of the setting member. This permits the selection of a high clock frequency, with the advantageous effect described.

We claim:

1. In a method of producing a pulsed setting voltage by pulse-duration modulation at a relatively high clock frequency with an electric control signal, thereby to activate a setting drive having an inductance, particularly an electric motor setting drive for a throttle valve of an internal combustion engine, the improvement comprising the steps of pulse-duration modulating the setting voltage at a relatively low modulation frequency; and pulse-duration modulating the setting voltage with a control signal concurrently with said first-mentioned step of pulse-duration modulating.

2. The method according to claim 1, further comprising selecting the high clock frequency to be in the range of 10–20 kHz; and selecting the low modulation frequency to be in the range of 10–100 Hz.

3. The method according to claim 1, further comprising setting the high clock frequency to be at a value of more than 16 kHz; and setting the low modulation frequency to be in the range of 40–50 Hz.

4. The method according to claim 1, wherein the high clock frequency is at a value of more than 16 kHz and the low modulation frequency is in the range of 10–100 Hz.

5. In a device for producing a pulsed pulse-duration modulated setting voltage for the operation of a setting drive of a throttle valve of an internal combustion engine, the improvement comprising a pulse-duration modulator and clock means for feeding the modulator for the production of the pulsed setting voltage, by a clock signal of high clock frequency, said modulator having at least one modulation input and means for feeding said modulator with a low modulation frequency signal and a control signal superimposed thereon as additional pulse-duration modulation.

6. The device according to claim 5, wherein the high clock frequency is in the range of 10–20 kHz and the low modulation frequency is in the range of 10–100 Hz.

7. The device according to claim 5, wherein the high clock frequency has a value greater than 16 kHz and the low modulation frequency is in the range of 40–50 Hz.

8. The method according to claim 1, wherein said modulating at said relatively low frequency is accomplished with a substantially sinusoidal waveform signal.

9. The device according to claim 5, wherein said low modulation frequency signal is a substantially sinusoidal waveform signal.

* * * * *